Sept. 1, 1959 J. A. LENO 2,902,628
TERMINAL ASSEMBLY WITH CELLS FOR ELECTRICAL COMPONENTS
Filed Sept. 12, 1952 3 Sheets-Sheet 1

Inventor
J. A. LENO
By [signature]
Attorney

TERMINAL ASSEMBLY WITH CELLS FOR ELECTRICAL COMPONENTS

Filed Sept. 12, 1952 3 Sheets-Sheet 2

*Inventor*

J. A. LENO

*By* [signature]

*Attorney*

Sept. 1, 1959 J. A. LENO 2,902,628

TERMINAL ASSEMBLY WITH CELLS FOR ELECTRICAL COMPONENTS

Filed Sept. 12, 1952 3 Sheets-Sheet 3

Inventor
J. A. LENO
By R P Morris
Attorney 2,902,628

TERMINAL ASSEMBLY WITH CELLS FOR ELECTRICAL COMPONENTS

John Albert Leno, London, England, assignor to International Standard Electric Corporation, New York, N.Y., a corporation of Delaware Application September 12, 1952, Serial No. 309,197

Claims priority, application Great Britain September 14, 1951

1 Claim. (Cl. 317—101)

This invention relates to the mounting of small electrical circuit components and more particularly to the manufacture of a rectifier matrix in which the connections between the rectifier units may be printed electrical conductors.

Certain embodiments of the present invention make use of the method of printing, or otherwise depositing, conducting tracks of a paste containing finely-divided silver on a fabric insulating base as is described in British Patent No. 718,811, filed Sept. 29, 1950, and published March 9, 1955.

The main feature of the invention consists in an assembly device for small electrical components forming part of an electric circuit comprising a plurality of flat plates of insulating material one or more of which are formed with apertures and which together form individual cells for the individual electrical components having axes at right angles to the planes of the plates.

Figure 1:
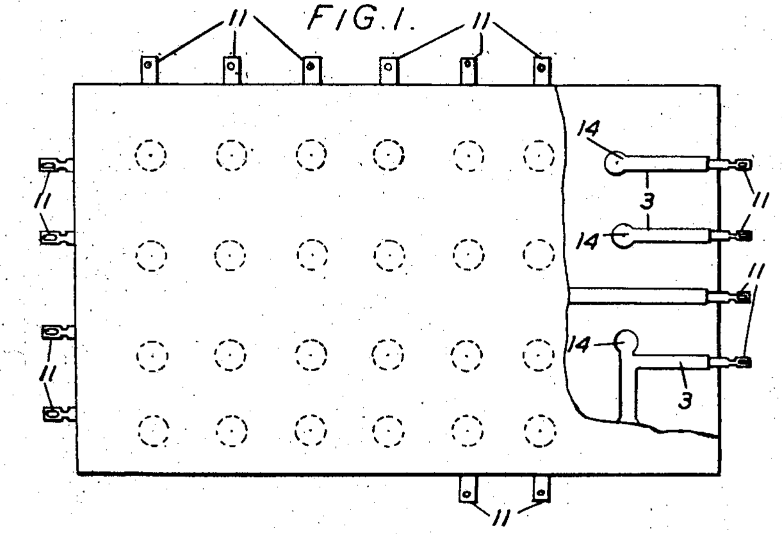
Figure 2:
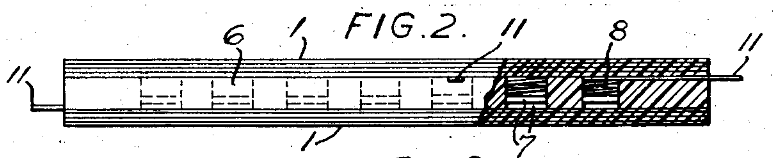
Figure 3:
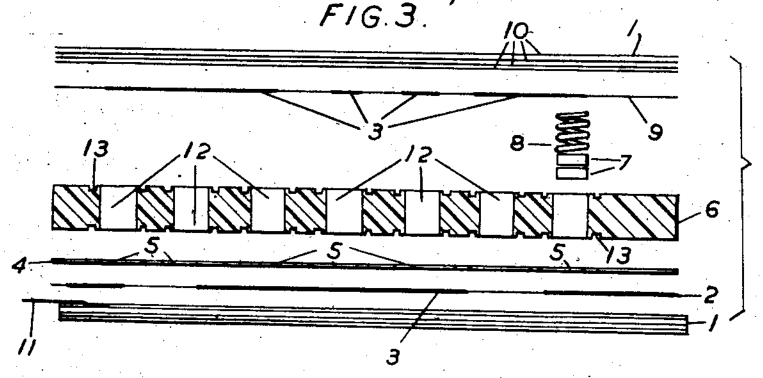
Figure 4:
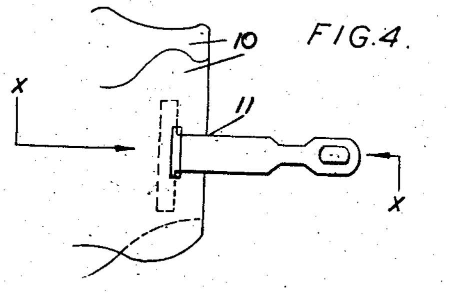
Figure 5:
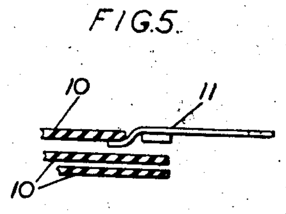
Figure 6:
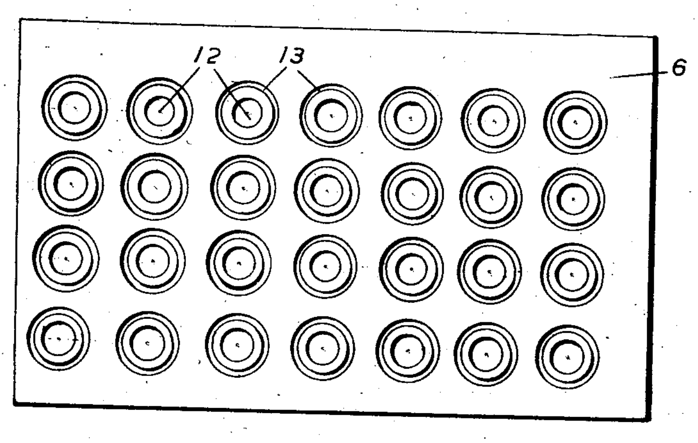
Figure 8:
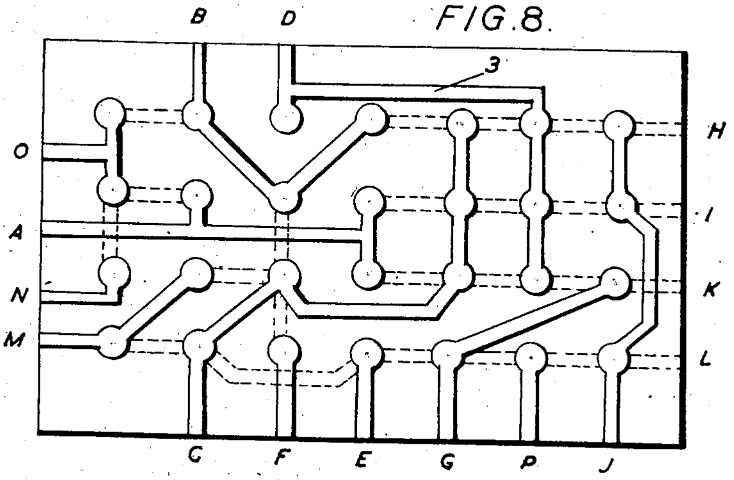
Figure 9:
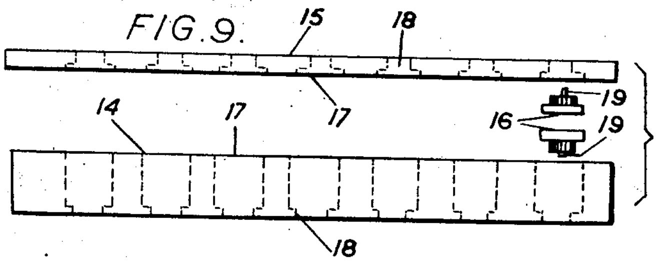
Figure 7:
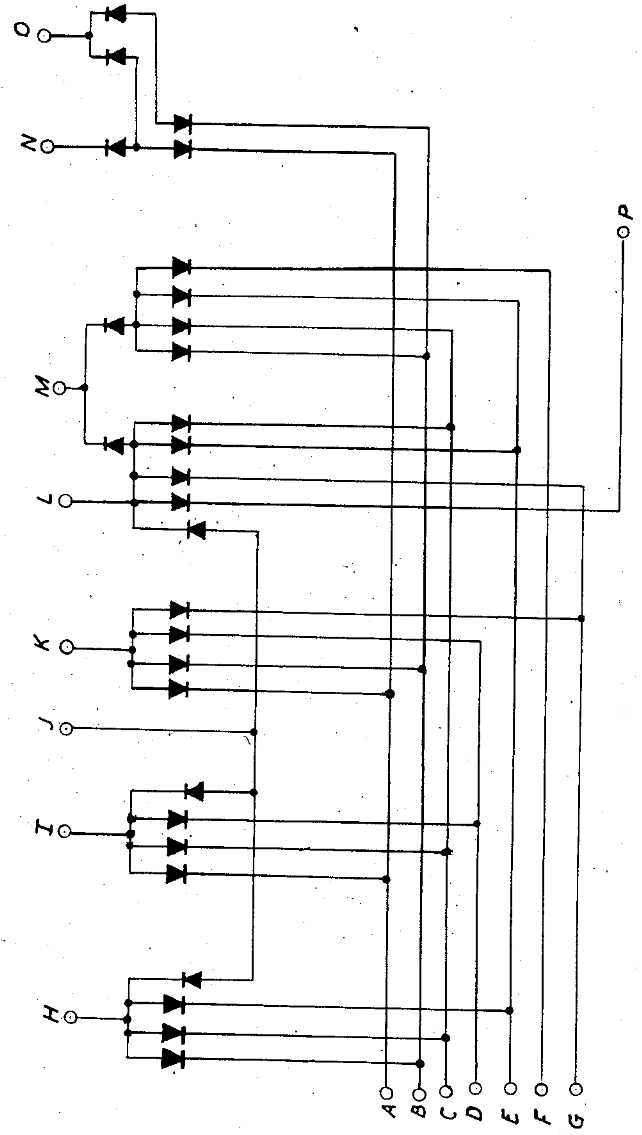

Two embodiments of the invention will now be described with reference to the figures of the drawings in which:

Fig. 1 shows a part cut-away top view of a rectifier matrix according to the present invention, Fig. 2 is a side view, partly in section, of the matrix of Fig. 1, Fig. 3 is an exploded section through the rectifier matrix which for the sake of clarity shows some layers with exaggerated thickness, Fig. 4 shows a means for attaching connecting tags, Fig. 5 is a section through line X—X of Fig. 4, Fig. 6 is a top plan view of the core of the rectifier matrix, Fig. 7 is a schematic of the complete arrangement, Fig. 8 is a diagram of the printed circuit equivalent of Fig. 7 and in which the connections to the rectifier cells are shown respectively as dotted and as full lines for the two sides of the matrix, and Fig. 9 shows another embodiment of the invention which does not employ the printed circuit technique.

In Fig. 1 the conducting tracks 3 of silver, simulating the wiring and the points of connection 14 to the rectifier cell assemblies comprising plates 7 and spring 8 (Fig. 3) are first printed or otherwise deposited in paste form on a fabric base e.g. organdy. This is shown more clearly in Fig. 3 where a conducting track 3 is printed on an organdy or like fabric base 2 or 9. The silver paste is applied to one side only of the fabric but appears equally on both sides since the interstices of the warp and weft of the fabric permit complete absorption of the silver paste within the area to which it is applied. The warp and weft of the fabric are also instrumental in keeping the configuration of the printed track or area, sharply defined.

At this stage it is preferable to consolidate the conducting tracks by the application of heat and light pressure.

The two outer plates 1 of the whole assembly are made up of four to six sheets of uncured Bakelite fabric 10. The innermost sheets of these two stacks are slotted at suitable intervals around their edges for the admission of connecting tags 11, as shown in Figs. 4 and 5. When the stack of uncured sheets is assembled, as in Fig. 5, the individual sheets 10 are moulded together under heat and pressure to form the plates 1 complete with tags 11 moulded firmly therein.

The core 6, shown in section in Fig. 3 is machined from a sheet of synthetic thermoplastic or thermosetting resin-bonded paper, commonly known as SRBP. It comprises 28 holes, 12, for the housing of the rectifier cells. Each hole 12 has, one on each side of the core 6, circular grooves 13 concentric with their associated hole. These grooves form "dry moats" which during the final operation in which the layers of the whole assembly are bonded together, receive excess resin which would otherwise flow into the holes 12.

It is convenient to mould the whole assembly in two stages. In the first stage layers 1, 2, 4 and the core 6 are first bonded together mainly using the impregnated resin from an uncured sheet of Bakelite fabric 4. The fabric 4 is provided with openings 5 aligned with the holes 12 to prevent the resin from flowing on those portions of the printed base 2 which contact the rectifier cell terminals. This operation can be carried out under the optimum conditions of heat and pressure. The degree of heat used is of the order of 150° centigrade which is sufficient to cause damage to the rectifier cells if the moulding of the unit was performed in one operation. Thus one half of the "sandwich" is completed before the rectifier assemblies are introduced. When the rectifier plates 7 and springs 8 are in situ and making contact with the circuit on the printed base 2, the upper plate 10 to which the printed fabric 9 has first been moulded is brought into position with a resin adhesive spread on the upper face of the core 6 between the holes 12. The resin used in this second stage may be of any type requiring a lower degree of temperature for complete polymerization and in any case should not exceed 50° C.

The complete assembly is then subjected to a pressure of about 4 tons/sq. in. at the above-mentioned temperature of 50 degrees C. in order to bond it into a unitary whole.

Alternatively, instead of moulding all the plates into a unitary whole, the layers of fabric 2 and 9 carrying printed circuitry can each be bonded to their corresponding layers of Bakelite fabric 1. The two resulting plates may then be secured to the core 6 by riveting or screwing. In this case the sheet 4 of uncured Bakelite fabric may be omitted.

The type of circuit to which the invention can be readily applied is shown in Fig. 7. It comprises a number of small rectifier cells, such as are used for instance, in coincidence-pulse gating arrangements for electronic switching systems, and their associated wiring and points of input and output.

Fig. 8 shows the printed equivalent of the wiring of Fig. 7 in which the full lines represent the connections on one side of the "sandwich" and the dotted lines, connections on the other side.

A further embodiment in which the connections to the rectifier cells are not provided by printed or like technique is shown in Fig. 9.

The construction is much simplified in that the "sandwich" of the previous embodiment is superseded by the "honeycomb" portion 14 having a lid-like member 15. The "honeycomb" 14 and the lid 15 are fitted with the required number of contacts 16 which are of silver-plated brass. These contacts are pressed into the holes 17 on to shoulders 18. The contacts are thus located and firmly held by reason of their tight fit in the said holes. The contacts are provided with pips 19 which project from the upper and lower faces of the assembled unit to which soldered connections using either wire or perforated strip can be made.

The rectifier cells are placed in the holes 18 as in the previous embodiment and the lid 15 is temporarily replaced and clamped while the rectifiers are individually tested. If the unit is satisfactory the lid is firmly fixed to the "honeycomb" 14 by moulding with a resin adhesive or by riveting or screwing after which the unit may be dipped or sprayed with a suitable medium to prevent the ingress of moisture.

While the principles of the invention have been described above in connection with specific embodiments, and particular modifications thereof, it is to be clearly understood that this description is made only by way of example and not as a limitation on the scope of the invention.

What I claim is:

An assembly device for electrical components which have terminals and form part of an electric circuit comprising an insulating member having a substantially flat surface and a plurality of apertures in said surface forming individual cells for positioning the electrical components with their terminals substantially in the plane of said surface, said insulating member having another surface substantially parallel to said substantially flat surface, the said apertures extending through said member to said other surface, so that the cells extend completely through said member, a sheet of insulating material positioned parallel to said flat surface, conductive tracks on the side of said sheet towards said member with portions thereof spaced in correspondence with the spacing of said apertures in said insulating member, a second sheet of insulating material positioned parallel to said other surface of said insulating member, said second sheet also having conductive tracks on the side toward said member with portions spaced in correspondence with said apertures, and means for retaining said insulating member and said first and second sheets of insulating material in close proximity to provide electrical connections between said conductive tracks on said first sheet of insulating material and said first mentioned terminals of said components in said cells and for retaining said insulating member and said second sheet of insulating material in close proximity to provide electrical connections between the conductive tracks on said second sheet and the other terminals of said components which are substantially in the plane of said other surface and to secure said components in said individual cells, said first and second sheets of insulating material forming coverings for said connections.

References Cited in the file of this patent

UNITED STATES PATENTS

| | | |
|---|---|---|
| 1,718,993 | Wermine | July 2, 1929 |
| 1,939,130 | Mills | Dec. 12, 1933 |
| 2,547,022 | Leno | Apr. 3, 1951 |
| 2,691,144 | Parsons et al. | Oct. 5, 1954 |

FOREIGN PATENTS

| | | |
|---|---|---|
| 686,445 | France | July 25, 1930 |